United States Patent [19]
Kulig

[11] 3,968,737
[45] July 13, 1976

[54] DISJOINABLE ASSEMBLY DESIGNED FOR CONNECTING OF PISTON WITH PISTON ROD IN ENGINES AND MACHINES, PARTICULARLY SUITABLE FOR USE IN COMPRESSORS

[75] Inventor: Stanislaw Kulig, Krakow, Poland

[73] Assignee: Osrodek Badawczo-Rozwojewy Przemyslu Budowy Urzadzen Chemicznych "Cebea", Krakow, Poland

[22] Filed: Mar. 13, 1975

[21] Appl. No.: 558,114

[30] Foreign Application Priority Data
Apr. 5, 1974 Poland .................................. 170132

[52] U.S. Cl. .................................. 92/258; 92/221; 92/257; 403/258; 403/260
[51] Int. Cl.² .................................................... F16J 1/12
[58] Field of Search ............. 92/218, 217, 221, 258, 92/257; 403/260, 258, 259

[56] References Cited
UNITED STATES PATENTS

| | | | |
|---|---|---|---|
| 2,739,854 | 3/1956 | Maybach | 92/221 |
| 2,793,089 | 5/1957 | Anderson | 92/257 |
| 3,704,734 | 12/1972 | Soto et al. | 403/258 X |

FOREIGN PATENTS OR APPLICATIONS

| | | | |
|---|---|---|---|
| 1,221,499 | 7/1966 | Germany | 403/258 |
| 551,170 | 11/1956 | Italy | 92/258 |
| 17,888 | 7/1907 | United Kingdom | 403/259 |

*Primary Examiner*—Irwin C. Cohen
*Attorney, Agent, or Firm*—Haseltine, Lake & Waters

[57] ABSTRACT

A disjoinable assembly designed for connecting of piston with piston rod in engines and machines, this assembly being particularly suitable for use in compressors, includes an insert [4] and a bolt connector [3] mounted in the said insert, said connector cooperating with piston rod [2]. The insert [4] is U-shaped in cross-section, it has preferably the form of a cylinder with bottom [8] at one end, said bottom having a hole [9], and it is provided with bearing surfaces [12] in the form of splineways [10] or splines [14], said bearing surfaces [12] being matched with bearing surfaces [13] made in the form of splines [11] or splineways [15] on the piston rod [2]. The insert [4] is fixed in position relative to piston [1] and piston rod [2] by means of dogs [20], said dogs being formed by bending the sections of rim [16] toward one or more sockets [6] made in piston [1], and by bending the other sections of the said rim [16] toward one or more sockets [17] made in connector [3].

6 Claims, 7 Drawing Figures

DISJOINABLE ASSEMBLY DESIGNED FOR CONNECTING OF PISTON WITH PISTON ROD IN ENGINES AND MACHINES, PARTICULARLY SUITABLE FOR USE IN COMPRESSORS

This invention relates to a disjoinable assembly designed for connecting of piston with piston rod in engines and machines, this assembly being particularly suitable for use in compressors.

In accordance with the previously proposed method the position of piston relative to piston rod is fixed by means of keys. Such a construction provides, in principle, for fixed positioning of piston relative to piston rod, but the possibility to change this position in certain necessary cases is severely limited. Another imperfection of such a construction is the proneness of the keyway to deformation and damage, particularly in the case when aluminium alloy pistons are used. Besides, the keyways in the piston as well as in the piston rod, reduce the strength of joined elements in the zone of joining, making thus the danger of piston and piston rod failure more likely.

It has also previously been proposed to join the piston with the piston rod by means of bolts or nuts, usually locking these bolts or nuts by means of lock washers. The drawback of such a construction is that the lock washer can only be used in the case when the head of the bolt or the nut projects above the face of the piston. The construction of this type unfavorably reflects on the shape of the piston crown and of the compression space.

In accordance with another known method the piston is joined with the piston rod by means of a bolt countersunk in the piston, this bolt being then locked by means of a lock screw. The drawback of this method of joining is that new tapped holes have to be made after each assembly and disassembly of the piston and piston rod, making of these holes causing a permanent damage to the piston and to the screw. Such method of locking is little efficient and stable in the case of aluminium alloy pistons. Making of new tapped holes for locking screw causes that after the piston and piston rod are disassembled several times, the worn locking screw has to be replaced, and sometimes the piston or piston rod needs replacement. Imperfect in the latter construction is that the position of the piston with the retainer rings cannot be changed, for instance in non-lubricated compressors and particularly when the piston operates in horizontal position, such a change of position being used in order to extend the life of the retainer rings.

An object of the present invention is to obviate or mitigate the disadvantages present in assemblies known and used hitherto for joining together of pistons and piston rods. The technical problem to obtain the joining assembly of a new type has been solved by developing a piston/piston rod joining assembly whose elements are securing a reliable connection and simplify all assembly and disassembly operations.

Thus a piston/piston rod joining assembly has been developed in accordance with the present invention, wherein an insert including a bolt connector is seated in the front part of the piston, this insert co-operating with piston rod, being U-shaped in cross-section and having preferably the form of a cylinder with a holed bottom at one end, the bearing surfaces of the said insert being splined and operating jointly with splined bearing surfaces of piston rod. Besides, in the cylindrical part at the open end the insert includes a thinned wall, a so called rim, said insert being fixed in position relative to the piston and piston rod by means of dogs formed through bending of the said rim toward one or more sockets provided in the piston, and toward one or more sockets provided in the connector.

The construction of invented joining assembly can also be solved in such manner that the co-operating with the piston rod connector has the form of a nut.

The invented assembly designed for joining of elements provides for a more reliable connection between the piston and piston rod, and simplifies all assembly and disassembly operations. The invention provides for fixing of piston position relative to the cylinder, thus securing a uniform over the whole cicumference wear of the ring which fixes the piston in position. Besides, a suitable selection of the elements of the connection allows that the piston rod can be kept shorter because the flat faces, so called faces for a wrench, are superfluous on the cylindrical part of piston rod. An additional advantage gained from elimination of the above mentioned flat faces is that the source of possible damage to gas or oil stuffing-box rings is eliminated during the assembly or disassembly of these elements.

An embodiment of the present invention will now be described, by way of example, with reference to the accompanying drawing in which.

Figure 1:
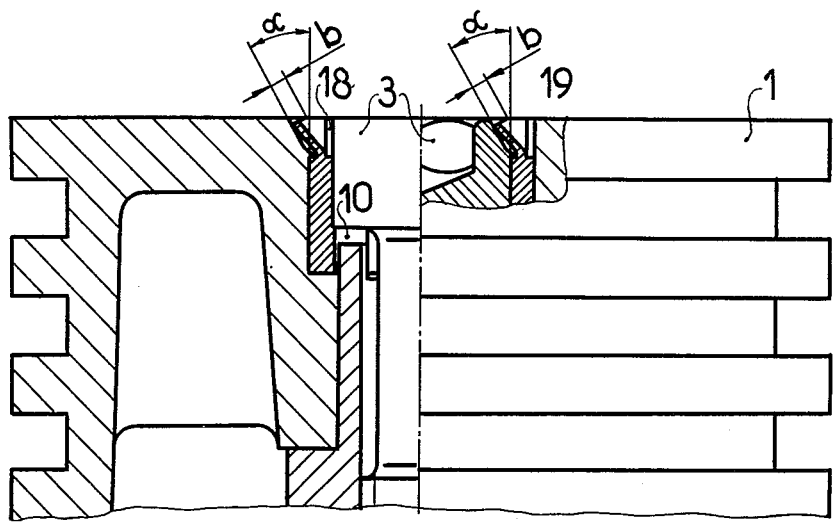
FIG. 1 illustrates in cross-section the piston including the joining elements.
Figure 2:
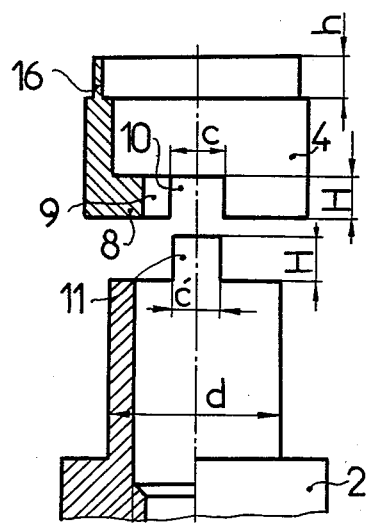
FIG. 2 illustrates in half section and in half view the insert and the piston rod.
Figure 4:
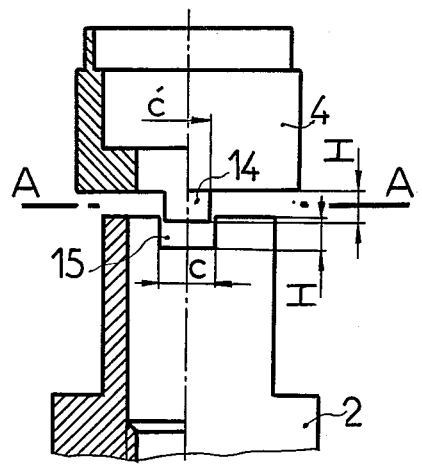
FIG. 4 illustrates in half view and in half section the piston rod and the insert.
Figure 3:
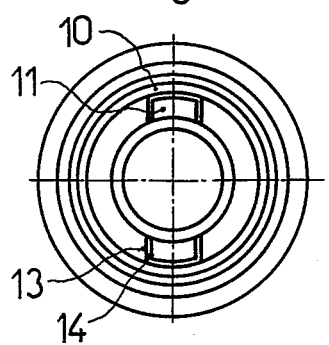
FIG. 3 illustrates in plan the insert and the piston rod.
Figure 5:
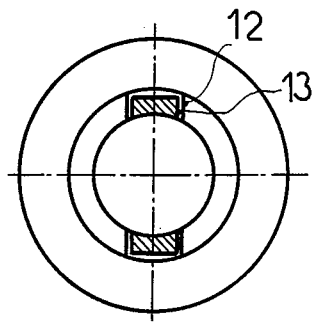
FIG. 5 illustrates the insert and the piston rod in section along the A—A line.

Piston 1 has a recess 5 made at the end facing the compression space, said recess including sockets 6 cut in a number as desired and having width a and height b, bases 7 of the said sockets having an inclination relative to the centre line of insert 4, said insert receiving a connector 3 made in the form of a bolt, said connector co-operating with the end of piston rod 2. In the bottom part of insert 4, said insert having preferably the form of a cylinder with a bottom 8 provided with a hole 9, splineways 10 or splines 14 are provided, said splineways or splines matching splines 11 or splineways 15 provided on the piston rod 2, the co-operation of the said splines and splineways taking place by means of bearing surfaces 12, said surfaces being arranged in accordance with splineways 10 or splines 14 in the insert 4 with bearing surfaces 13, said later surfaces being arranged in accordance with splines 11 or slineways 15 on the piston rod 2.

The top part of insert 4 is much thinner than its bottom part, this thinning forming a rim 16, said rim, after bending it toward sockets 6 or toward sockets 17 made in connector 3, forming dogs 20, said dogs fixing in position the connector 3 relative to piston rod 2 and piston 1, and thus securing the connector 3 against rotation. Free spaces 18 and 20 formed by rim 16 — at one end between the rim and the piston, at the other end between the rim 16 and the connector 3 — provide the clearance for applying of the tool required for bending of rim 16 toward the sockets 6 and 17 as well as for bending of the said rim straight, said free spaces simplifying also the assembly and disassembly of connector 3 after the insert 4 has been used many times, the rim 16 of the said insert being likely the subject of plastic strain resulting from bending.

Figure 6:
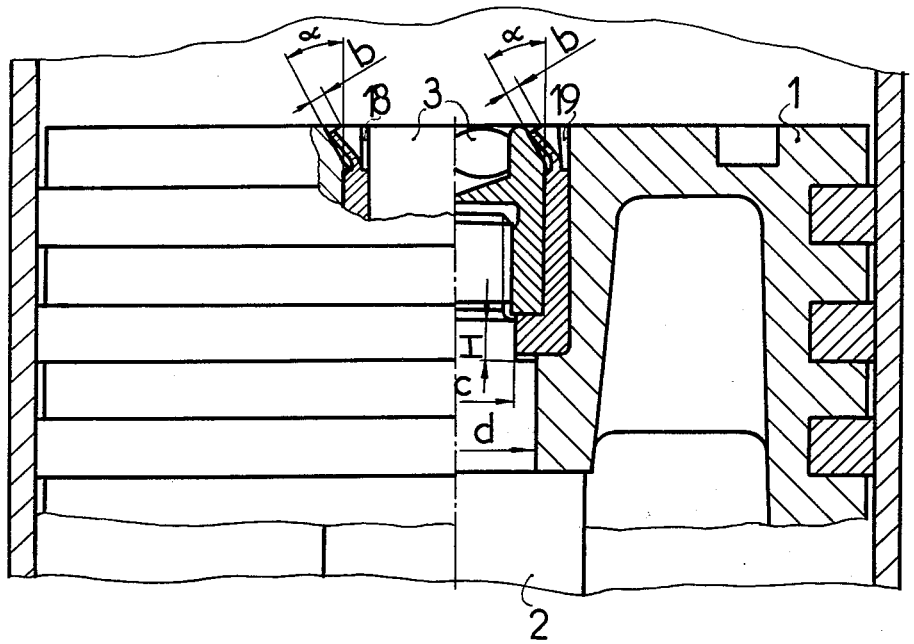
FIG. 6 illustrates in half view and in half-cross-section the cylinder with the piston connected with piston rod by means of a nut connector.
Figure 7:
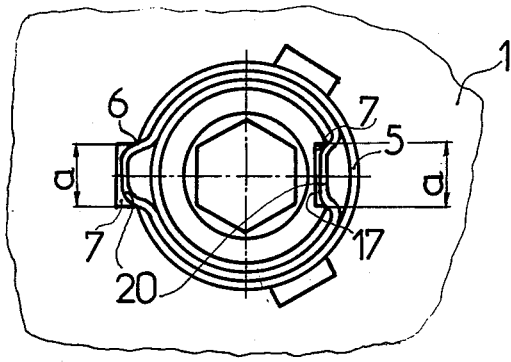
FIG. 7 illustrates in plan the piston, the connector and the insert.

In accordance with the modified construction of the invented joining assembly as illustrated in FIG. 6, the connector 3 made in the form of a special nut co-operates with the piston rod 2 whose end is made, in this case, in the form of a stud.

What we claim is:

1. The combination of a piston and piston rod with a demountable assembly connecting the piston and piston rod, said piston having an end face with a recess therein and at least one socket extending from said recess, a tubular insert in said recess and abutting an axially facing wall thereof, a connector in said insert and in engagement with a portion thereof, said piston rod abutting an axially facing portion of said piston and means engaging said connector with said piston rod, said insert and piston rod including means defining a splined connection therebetween, said insert having an upper portion which is thinner than its lower portion, said upper portion forming a single, axially extending thin rim which includes portions bent laterally, said rim having an outer diameter less than the outer diameter of the lower portion of the insert connected thereto and an inner diameter greater than the inner diameter of the lower portion of the insert connected thereto; said connector having at least one socket therein, one portion of said rim being being bent outwardly into the socket in said piston and a second portion being bent inwardly into the socket in said connector to secure the connector against rotation, said rim initially forming free spaces with said connector and piston to permit bending the rim into said sockets after installation of the insert into said recess.

2. The combination as claimed in claim 1 wherein said engaging means are screwthreads.

3. The combination as claimed in claim 2 wherein said connector is a nut.

4. The combination as claimed in claim 2 wherein said connector is a bolt.

5. The combination as claimed in claim 1 wherein said insert is of U-shaped cross-section having a bottom with a hole therein, said connector fitting within the U-shaped insert and resting on said bottom to form the connection with the piston rod via said hole.

6. The combination as claimed in claim 1 wherein said bent portions form an acute angle with respect to the center line of the insert.

* * * * *